(12) United States Patent
Wakhare et al.

(10) Patent No.: US 10,185,688 B2
(45) Date of Patent: Jan. 22, 2019

(54) QUALITY OF SERVICE FOR INTERNAL I/OS USING INTERNAL FLOW MECHANISM

(71) Applicant: Veritas Technologies LLC, Mountain View, CA (US)

(72) Inventors: Prasanna Wakhare, Pune (IN); Niranjan Pendharkar, Pune (IN)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 465 days.

(21) Appl. No.: 14/952,506

(22) Filed: Nov. 25, 2015

(65) Prior Publication Data

US 2016/0292116 A1  Oct. 6, 2016

(51) Int. Cl.
  *G06F 3/06* (2006.01)
  *G06F 13/40* (2006.01)
  *G06F 9/455* (2018.01)
  *G06F 11/14* (2006.01)
  *G06F 12/0804* (2016.01)
  *G06F 12/0815* (2016.01)

(52) U.S. Cl.
  CPC .......... *G06F 13/4027* (2013.01); *G06F 3/068* (2013.01); *G06F 3/0613* (2013.01); *G06F 3/0619* (2013.01); *G06F 3/0631* (2013.01); *G06F 3/0659* (2013.01); *G06F 9/45558* (2013.01); *G06F 11/1451* (2013.01); *G06F 12/0804* (2013.01); *G06F 12/0815* (2013.01); *G06F 2009/45579* (2013.01); *G06F 2201/84* (2013.01); *G06F 2212/1032* (2013.01); *G06F 2212/152* (2013.01); *G06F 2212/281* (2013.01)

(58) Field of Classification Search
  CPC ......... G06F 2212/152; G06F 2212/157; G06F 2212/1032
  See application file for complete search history.

(56) References Cited

U.S. PATENT DOCUMENTS

| 8,463,881 | B1 * | 6/2013 | Baker | H04L 29/06 709/220 |
|---|---|---|---|---|
| 9,805,345 | B1 * | 10/2017 | Dailianas | G06Q 20/102 |
| 2014/0122685 | A1 * | 5/2014 | Aschoff | G06Q 40/02 709/223 |
| 2016/0234297 | A1 * | 8/2016 | Ambach | H04L 67/1008 |

* cited by examiner

*Primary Examiner* — Henry Tsai
*Assistant Examiner* — Christopher A Daley
(74) *Attorney, Agent, or Firm* — Patent Law Works LLP

(57) ABSTRACT

A method for Quality of Service (QoS) for internal input/output (I/O) using an internal flow mechanism in a storage system is provided. The method includes establishing internal I/O flows corresponding to external I/O flows for one or more computing machines or virtual machines implemented with physical computing resources requesting I/Os. The method includes inheriting service-level agreement (SLA) values from the external I/O flows to the internal I/O flows and determining demands for the external I/O flows and the internal I/O flows. The method includes distributing credits to the internal I/O flows and the external I/O flows according to minimum I/O operations per unit time values, based on the service-level agreement values, and distributing remaining credits to the external I/O flows and the internal I/O flows according to priority and demand of each of the external I/O flows and the internal I/O flows.

20 Claims, 4 Drawing Sheets

| Service Level Agreement Values 202 | External I/O Flow 118 | Credits 204 | Priority 206 | Demand 208 | Internal I/O Flow 120 | Credits 204 | Priority 206 | Demand 208 |
|---|---|---|---|---|---|---|---|---|
| SLA_1 (102) | EXT I/O_1 (118) | | | | INT I/O 1_1 (120) | | | |
| | | | | | INT I/O 1_2 | | | |
| | | | | | ... | | | |
| | | | | | INT I/O 1_N | | | |
| SLA_2 | EXT I/O_2 | | | | INT I/O 2_1 | | | |
| | | | | | INT I/O 2_2 | | | |
| | | | | | ... | | | |
| ... | | | | | | | | |
| SLA_M | EXT I/O_M | | | | INT I/O M_1 | | | |
| | | | | | INT I/O M_2 | | | |
| | | | | | ... | | | |

Data Structure 116

FIG. 2

QUALITY OF SERVICE FOR INTERNAL I/OS USING INTERNAL FLOW MECHANISM

BACKGROUND

Storage systems manage massive amounts of data and metadata and perform massive numbers of I/O (input/output) operations. For any storage stack, metadata I/Os are unavoidable. Modules such as file systems and volume managers keep metadata in storage memory, and need to reference and update this metadata whenever there is a change in layout due to file creation, file deletion, file truncation, writing to the file, etc. Other modules such as the volume manager also maintain metadata in storage memory to persist the volume layout. One major consumer of I/O operations is storage tiering, which keeps working data in a fast cache in a fast storage tier such as a solid-state drive (SSD) and purges data to a slow storage tier such as a hard disk drive (HDD) at various intervals. Storage tiering systems can also read hot data from a slower tier to a faster tier. In storage systems, there can be internal I/O operations. Episodic data synchronization generates a lot of I/O traffic periodically. Storage systems that have a large amount of I/O operations on SSD and HDD or other underlying storage devices or different storage tiers can be susceptible to giving false capacity determinations for Quality of Service operation. Varying internal I/O traffic combined with false capacity determinations result in uneven distribution of capacity among applications, congesting the system, and not meeting a service level agreement (SLA). Therefore, there is a need in the art for a solution which overcomes the drawbacks described above.

SUMMARY

In some embodiments, a processor-based method for Quality of Service (QoS) for internal input/output (I/O) using an internal flow mechanism in a storage system is provided. The method includes establishing, in a storage system, internal I/O flows corresponding to external I/O flows for one or more computing machines or virtual machines implemented with physical computing resources requesting I/Os to the storage system. The method includes inheriting service-level agreement (SLA) values from the external I/O flows to the internal I/O flows and determining demands for the external I/O flows and the internal I/O flows. The method includes distributing credits to the internal I/O flows and the external I/O flows according to minimum I/O operations per unit time values, based on the service-level agreement values, and distributing remaining credits to the external I/O flows and the internal I/O flows according to priority and demand of each of the external I/O flows and the internal I/O flows.

In some embodiments, a tangible, non-transitory, computer-readable media having instructions thereupon which, when executed by a processor, cause the processor to perform a method is provided. The method includes tracking, in a storage system, for one or more computing machines or virtual machines implemented with physical computing resources, each of a plurality of external I/O (input/output) flows, having I/O requests for the storage system, and corresponding internal I/O flows. The method includes inheriting service-level agreement (SLA) values including priorities and minimum I/O operations per unit time from the external I/O flows to the internal I/O flows and calculating demands for each of the external I/O flows and each of the internal I/O flows. The method includes assigning credits for each of the external I/O flows and each of the internal I/O flows, based on the minimum I/O operations per unit time in accordance with the service-level agreement values, and assigning further credits for each of the external I/O flows and each of the internal I/O flows, based on the priorities and calculated demands.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a data structure suitable for use in the storage system of FIG. 1.

DETAILED DESCRIPTION

Quality of Service (QoS) is responsible for calculating the dynamic capacity of the system and distributing credits per service level agreement (SLA) to all entities eligible for Quality of Service, such as applications, virtual disks, volumes, filesystems, etc. These entities initiate external I/Os (i.e., I/O operations that originate external to the storage system). Usually, there is comparable I/O (input/output) traffic for internal I/Os (i.e., I/O operations internal to the storage system). For example, filesystem read ahead, populating a cache, and metadata I/O can congest a storage system. If not accounted for, then Quality of Service calculations can be incorrect. Embodiments of a storage system include a presently disclosed technique to take into account internally generated I/Os.

For every external entity that is eligible for Quality of Service, the present system keeps the corresponding implicit internal entity or flow eligible for Quality of Service. Service level agreement values such as priority and minimum I/O operations per second or other unit time are inherited from each external I/O flow to the corresponding internal I/O flow or flows. Demands are calculated and predicted for internal flows, just like for external flows. The credit distribution algorithm serves the minimum I/O operations per second or other unit time to the external I/O flows and the internal I/O flows. After this, the credit distribution algorithm distributes the rest of the credits according to priority and demand of the corresponding flow. This ensures that, for every external entity for which there is metadata I/O, sufficient credits are distributed and internal I/Os are accounted for. If an external I/O flow is of high priority, then the corresponding internal I/O flow(s) receive more credits because of the inherited priority. This ensures that for a high priority entity, such as a high priority virtual disk or volume, the internal I/Os are given preference over the internal I/Os for a lower priority entity. This also ensures the credits given to external I/O flows are not ballooned (i.e., over-generously or over-optimistically determined and assigned), but are instead well matched to the number of I/Os the system can perform in order to get the desirable latency and throughput from the underlying storage.

Figure 1:
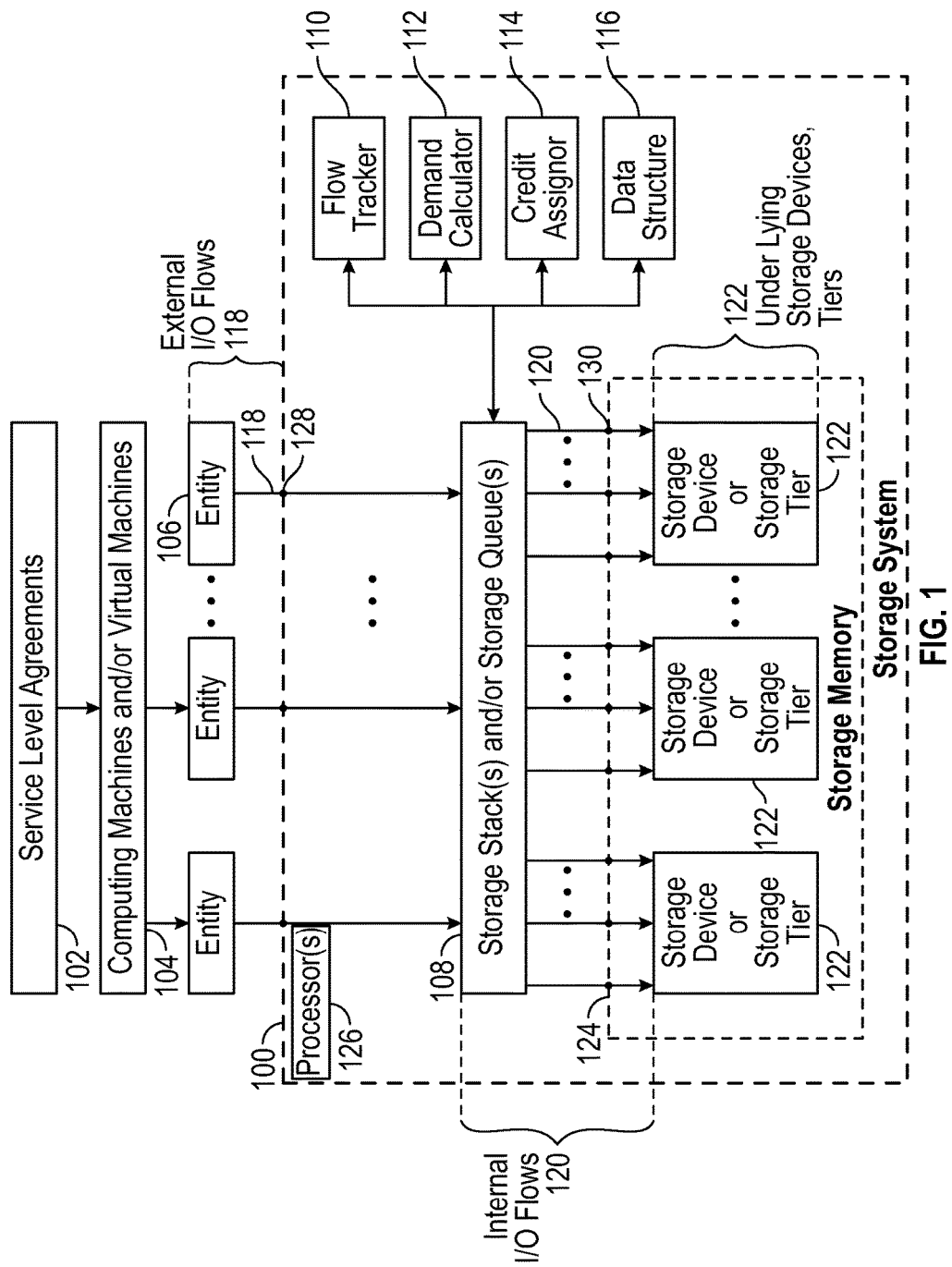
FIG. 1 is a block diagram of a storage system that uses an internal flow mechanism for internal I/O flows and Quality of Service, in accordance with an embodiment of the present disclosure.

FIG. 1 is a block diagram of a storage system 100 that uses an internal flow mechanism for internal I/O flows 120 and Quality of Service, in accordance with an embodiment of the present disclosure. Storage memory 124 includes various underlying storage devices or storage tiers 122, and could be internal or local to the storage system 100, as in direct attached storage, or networked or otherwise remote, as in network attached storage. Storage memory 124 could be dedicated, or virtualized. Various further types of storage memory 124 are readily devised for the storage system 100, in keeping with the teachings herein. Various components of the storage system 100 can be implemented in software executing on one or more processors 126, hardware, and/or firmware. The storage stack(s) and/or storage queue(s) 108 can be implemented as software stacks or queues or hardware stacks or queues. Modules, whether software or hardware, could be combined or split out into further modules, etc. An internal flow mechanism in the storage system 100 manages internal I/O flows 120 so as to implement or support Quality of Service, and includes a flow tracker 110, a demand calculator 112, a credit assignor 114 and a data structure 116, or variations thereof.

Service level agreements 102, which are usually set up by a user or an administrator, but could also be automated, specify various values of parameters relating to Quality of Service expected of the storage system 100 and servicing of I/Os from entities 106 operating on the computing machines and/or virtual machines 104. Computing machines and virtual machines can be implemented using physical computing resources. These entities 106 could include, for example, applications, virtual disks, file systems, volume managers, and/or various software, firmware or hardware processes or components, which make I/O requests to the storage system 100 for data or metadata to be written to or read from the storage system 100. These I/O requests take the form of external I/O flows 118. Each entity 106 has an associated external I/O flow 118, which encompasses all of the I/O requests from that entity 106 and is depicted in FIG. 1 as an arrow connecting the entity 106 to the storage system 100, and more particularly to a port 128 of the storage system 100 and thence to the storage stack(s) and/or storage queue(s) 108. Once an external I/O flow 118 is established, the storage system 100 spawns one or more internal I/O flows 120, which follow paths through the storage stack(s) and/or storage queue(s) to a port 130 and thence to the underlying storage devices or storage tiers 122 of the storage memory 124. In response to the internal I/O flows 120, the storage devices or storage tiers 122 perform requested data or metadata writes or reads. The internal flow mechanism, further described below, tracks and manages the external I/O flows 118 and the internal I/O flows 120 so as to deliver Quality of Service in accordance with the service level agreements 102.

The flow tracker 110 establishes existence of the external I/O flows 118 and the associated or corresponding internal I/O flows 120, and tracks all of these. To assist the flow tracker 110 in managing the external I/O flows 118 and the internal I/O flows 120, the credit assignor determines and assigns credits to each of the external I/O flows 118 and the internal I/O flows 120. It does so based on the service level agreements 102 and demand results calculated by the demand calculator 112. These three modules, the flow tracker 110, the demand calculator 112 and the credit assignor 114, share access to and communicate with each other through a data structure 116. All of these are shown in FIG. 1 as coupled to the storage stack(s) and/or storage queue(s), for example by a bus or network.

Values from the service level agreements 102 are inherited from the external I/O flows 118 to the internal I/O flows 120. Such inheritance can be performed by the flow tracker 110, which receives service-level agreements 102 from the computing machines and/or virtual machines 104 through the entities 106, and records values from the service-level agreements 102 in the data structure 116. Alternate paths for the storage system 100 to receive and process information from the service-level agreements 102 are readily devised.

The underlying storage devices or storage tiers 122 communicate with the storage system 100 regarding, among other aspects, latency and throughput on a per device or per tier basis. For example, a storage device or storage tier 122 could communicate about the delays or latency for serving an internal I/O flow 120 as delivered from the storage stack(s) and/or storage queue(s) 108. Also, the flow tracker 110 and the storage stack(s) and/or storage queue(s) communicate with each other about latency and throughput. For example, based on this communication, the flow tracker 110 could determine the delays or latency for queuing an internal I/O flow 120.

Based on the above information, the demand calculator 112 calculates demand for each of the external I/O flows 118 and internal I/O flows 120. Each demand is an estimate of the I/O operations per unit time (e.g., I/O operations per second, abbreviated as IOPs) demanded by a workload. The workload is associated with the entity 106 originating the external I/O flow 118 under consideration, and is further associated with the corresponding internal I/O flow(s) 120 spawned from that external I/O flow 118.

Using information from the service-level agreements 102 and the demand calculator 112, the credit assignor 114 determines and assigns credits to each of the external I/O flows 118 and each of the internal I/O flows 120. Determination of the credits is based on the minimum I/O operations per unit time (e g , minimum I/O operations per second, abbreviated as minIOPs), the priorities, and the calculated demands for each of the external I/O flows 118 and internal I/O flows 120. For example, the minimum I/O operations per unit time could be specified in the service-level agreements 102 and inherited by the internal I/O flows 120 from the respective external I/O flows 118. Priorities could likewise be from the service-level agreements 102 and inherited.

In accordance with the credits assigned by the credit assignor 114, the flow tracker 110 manages the external I/O flows 118 onto the storage stack(s) and/or storage queue(s) 118 and manages the internal I/O flows 120 through the storage stack(s) and/or storage queue(s) 118 and to the underlying storage devices or storage tiers 122. For example, when a particular I/O request from an entity 106 has sufficient credits, the flow tracker 110 could allow the I/O request belonging to an external flow 118 onto a storage stack or a storage queue, or move an I/O request belonging to an internal I/O flow 120 from a stack to a queue or vice versa. The flow tracker 110 could determine to which storage stack or which storage queue a particular I/O request belongs or should be placed, or to which underlying storage device or storage tier 122 a particular internal I/O flow 120 should be directed based on credits or aspects of the service-level agreements 102. The flow tracker 110 thus manages the internal I/O flows 120 through the storage stack(s) and/or storage queue(s) 118, on paths to the underlying storage devices or storage tiers 122, consistent with the credits of the internal I/O flows 120. This services the external I/O flows 118 and the internal I/O flows 120 in accordance with the credits distributed to each of these.

In one embodiment, the demand calculator 112 determines demand as follows.
Service-level agreements 102 specify, per flow:
Min-IOPs—Minimum IOPs guaranteed to workloads.
Max-IOPs—Maximum IOPs permitted to workloads.
Priority—Priority assigned to workload.
Deadline—Deadline in microseconds.
Burst IOPs—Permissible burst IOPs for applications. If not specified, the system will automatically detect burst and assign appropriate burst IOPs value.
NOTE: There are no strict deadline guarantees; nevertheless, the system will try to ensure that D(w1)<=D(w2) iff deadline specified by workload w1<deadline specified by workload w2.

The system monitors and records stats and feeds them to the various decision making controller modules, e.g., the flow tracker 110, the demand calculator 112 and the credit assignor 114. Following values are captured either periodically or per IO depending on the usage:
Rate of I/O completion per VM (virtual machine) per storage subsystem (comp_iops(i, j)).
Arrival IOPs per VM (ariops(I))
Average waiting time in the queue per VM (lq (i))
Average service (response) time per IO per underlying storage device(ls (i))

The controller wakes up every second and recalculates the capacity and queue depth of all the underlying storage devices. It applies queuing theory to the parameters collected by stats monitor to calculate:
Window—Maximum number of outstanding requests on a particular storage subsystem:

$$w(t, j) = (1 - \gamma)w(t-1, j) + \gamma\left(\frac{lat_{congestion}(j)}{ls(t-1, j)} * w(t-1, j)\right)$$

Where
$lat_{congestion\ (j)}$: Congestion point latency of jth storage device beyond which storage device saturates. This latency is determined and recalculated by the controller based on observed latencies and throughput
ls(t−1): service response time of j storage
Storage capacity—The value of window is calculated such that the storage is kept sufficiently busy to obtain the desired throughput at expected latency. Using queuing theory, total capacity of the storage subsystem is determined Storage subsystem capacity is in terms of IOPs. This also refers to the available credits for all workloads on that tick. Tick refers to the frequency of the controller at which it wakes up and refines its decisions. In some embodiments, the tick is one second:

$$C(t, j) = \frac{w(t, j)}{lat_{congestion}(j)}$$

Workload Demand—This is a guesstimate of IOPs demanded by a workload (VM or vdisk)

$$\text{Demand}[Ai] = \begin{cases} ariops(Ai) \text{ if } f\ tl[i] \leq D \\ \frac{ariops(Ai) * tl[i]}{D} \text{Otherwise} \end{cases}$$

$$tl[i] = lq[i] + ls[i]$$

Where,
D: Deadline of a workload as per SLA
ariops (Ai): Exponential moving average of arrival IOPs of Ai workload
tl[i]: Total latency which is summation of service latency and queuing latency of I/O In the above-described embodiment, the demand calculator 112 sets the demand of a flow proportional to an arrival I/O operations per unit time of the flow when a total latency for serving and queuing the flow is less than or equal to a deadline for the flow based on the service-level agreement values, for each of the external I/O flows 118 and each of the internal I/O flows 120. Otherwise, when the total latency for serving and queuing the flow is greater than the deadline for the flow based on the service-level agreement values, the demand calculator 112 sets the demand of the flow proportional to a sum of the arrival I/O operations per unit time of the flow plus the total latency for serving and queuing the flow, divided by the deadline for the flow, for each of the external I/O flows 118 and each of the internal I/O flows 120. Alternatively stated, when the total latency for serving and queuing the flow is greater than the deadline for the flow based on the service-level agreement values, the demand calculator 112 sets the demand of the flow proportional to the sum of the arrival I/O operations per unit time of the flow plus the total latency for serving and queuing the flow, and inversely proportional to the deadline for the flow, for each of the external I/O flows 118 and each of the internal I/O flows 120. Results of the demand calculations performed by the demand calculator 112 can be posted by the demand calculator 112 in the data structure 116. Demand, as determined by the demand calculator 112 is thus based on the arrival I/O operations per unit time and the total latency for serving and queuing, for each of the external I/O flows 118 and each of the internal I/O flows 120. Demands are therefore based on latency of the underlying storage in the storage system 100.

In one embodiment, the credit assignor 114 determines and assigns credits as follows. The credit assignor 114 determines credits first according to the minimum I/O operations per unit time for each external I/O flow 118 and each internal I/O flow 120, per the service-level agreements 102. This assures that each external I/O flow 118 will meet the minimum requirement for I/O operations per unit time that the service-level agreements 102 specify. After distributing these credits to the external I/O flows 118 and internal I/O flows 120, the remaining available credits are distributed by the credit assignor 114. To each of the external I/O flows 118 and each of the internal I/O flows 120, the credit assignor 114 assigns further credits in proportion to the priority of each flow but less than the demand for the flow. Demands may be calculated according to the equation mentioned above in paragraph 23 and it is the statistical prediction of I/O demand for the future. It should be appreciated that giving credits more than demand is wasteful and that is the reason credits are being capped by demands. The total number of credits distributed with each system tick (e.g., once per second) is based on the total I/O capacity of the storage memory 124, i.e., the total ability of all of the underlying storage devices or storage tiers 122 to handle I/O operations during that time unit.

One characteristic in various embodiments is that the credit assignor 114 assigns a greater number of credits to an internal I/O flow 120 corresponding to an external I/O flow 118 of higher priority than to an internal I/O flow 120 corresponding to an external I/O flow of lower priority. This is a result of the service level agreement values being inherited from the external I/O flows 118 to the internal I/O flows. Another characteristic in various embodiments is that initially distributing the credits based on the minimum I/O operations per unit time value, and distributing the remaining credits according to the priority and demand, ensures that credits given to the external I/O flows 118 are consistent with latency and throughput of the underlying storage of the storage system 100.

FIG. 2 is a data structure 116 suitable for use in the storage system 100 of FIG. 1. The data structure 116 could be implemented in any type of memory, as a list, database, aggregated or distributed data or metadata, and with various formats appropriate to names and parameter values. In the embodiment shown, the data structure 116 has places for service level agreement values 202, external I/O flows 118, and credits 204, priority 206 and demand 208 for each external I/O flow 118. For each external I/O flow 118 there is a place for the one or more internal I/O flows 120 that correspond to that external I/O flow 118. And, for each internal I/O flow 120, there is a place for the credits 204, priority 206 and demand 208 of that internal I/O flow 120. For example, in the first group of associated flows, there is a service level agreement 102 named "SLA_1" that belongs with the external I/O flow 118 named "EXT I/O_1" and internal I/O flows 120 named "INT I/O 1_1" through "INT I/O 1_N". Each of these flows, the external I/O flow 118 and the internal I/O flows 120 would have credits 204, priority 206 and demand 208 represented in the data structure 116. Other groups of associated external and internal I/O flows 118, 120 would be represented likewise. These names are by example only, and further naming conventions are readily devised.

Variations of the data structure 116 are readily devised. For example, the modules of the storage system 100 could communicate with each other, by sending messages and recording data or metadata local to each module, which acts as a distributed data structure 116. Or, portions of the data structure 116 could be owned and operated by each module, etc.

Figure 3:
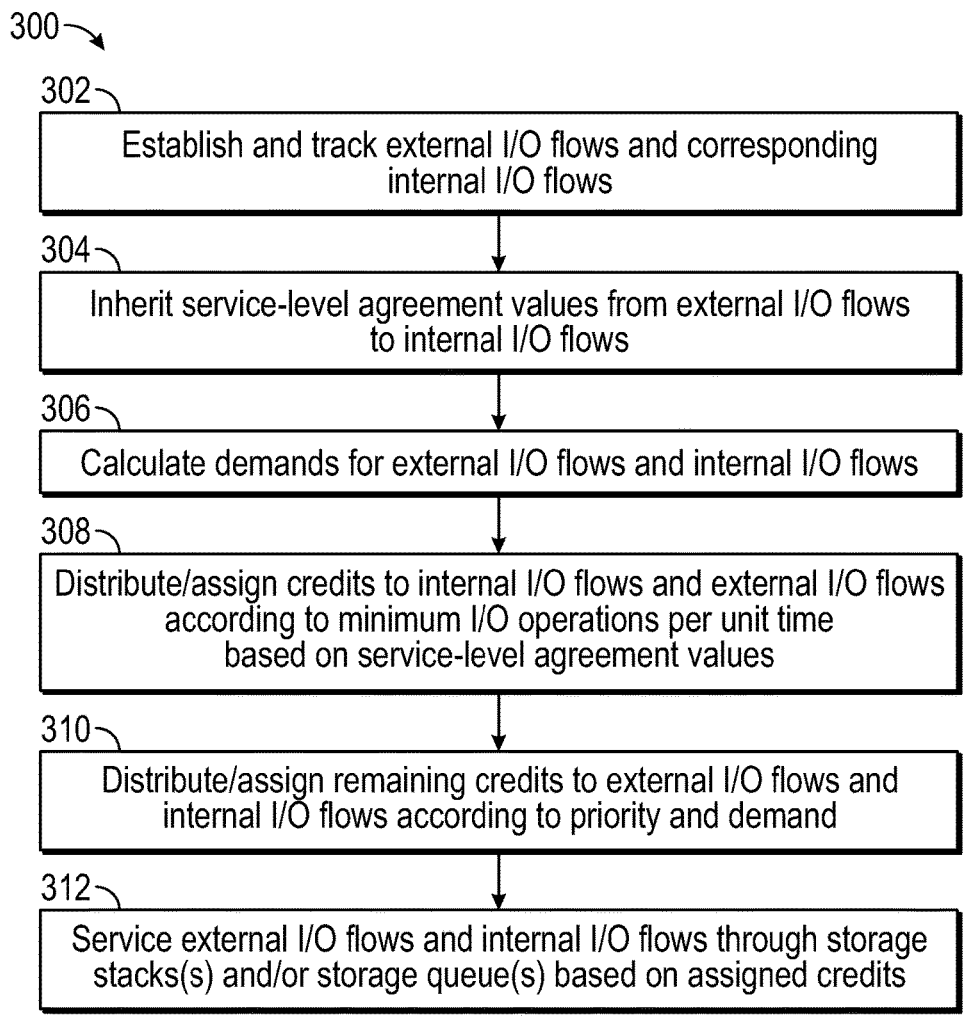
FIG. 3 is a flow diagram of a method for Quality of Service for internal I/O using an internal flow mechanism in a storage system, which can be practiced on or by the storage system of FIG. 1.

FIG. 3 is a flow diagram of a method for Quality of Service for internal I/O using an internal flow mechanism in a storage system, which can be practiced on or by the storage system of FIG. 1. The method can be practiced by one or more processors of the storage system. In an action 302, external I/O flows and corresponding internal I/O flows are established and tracked. In an action 304, service-level agreement values are inherited from the external I/O flows to the corresponding internal I/O flows. In an action 306, demands are calculated for the external I/O flows and the internal I/O flows. A demand estimates the number of I/O operations per second or other unit time that a workload demands.

In an action 308, credits are distributed or assigned to internal I/O flows and external I/O flows. The credits are assigned according to the minimum I/O operations per second or other unit time, based on service-level agreement values. In an action 310, remaining credits are distributed or assigned to external I/O flows and internal I/O flows, according to priority and demand. In an action 312, the external I/O flows and the internal I/O flows are serviced through the storage stack(s) and/or storage queue(s). The servicing is based on the assigned credits.

Figure 4:
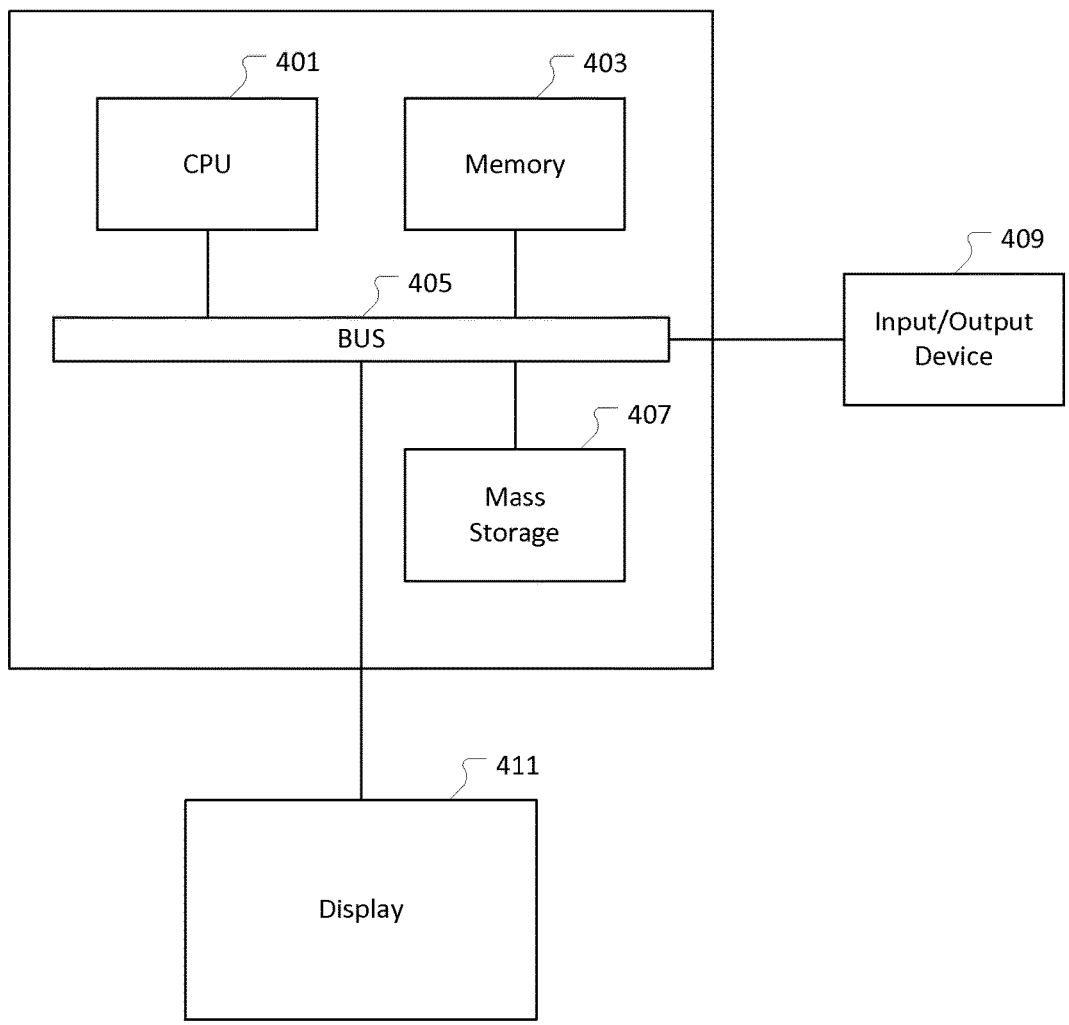
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for the internal flow mechanism in a storage system in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented by physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware--for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A processor-based method for Quality of Service (QoS) for internal input/output (I/O) using an internal flow mechanism in a storage system, comprising:

establishing, in a storage system, internal I/O flows corresponding to external I/O flows for one or more computing machines or virtual machines implemented with physical computing resources requesting I/Os to the storage system;

inheriting service-level agreement (SLA) values from the external I/O flows to the internal I/O flows;

determining demands for the external I/O flows and the internal I/O flows;

distributing credits to the internal I/O flows and the external I/O flows according to minimum I/O operations per unit time values, based on the service-level agreement values; and distributing remaining credits to the external I/O flows and the internal I/O flows according to priority and demand of each of the external I/O flows and the internal I/O flows.

2. The method of claim 1, further comprising:

servicing in the storage system the internal I/O flows and the external I/O flows in accordance with the credits distributed thereto.

3. The method of claim 1, wherein determining the demands is based on arrival I/O operations per unit time of a flow and based on total latency for serving and queuing the flow.

4. The method of claim 1, wherein distributing the remaining credits according to the priority and demand comprises distributing credits proportional to priority of a flow.

5. The method of claim 1, wherein distributing the remaining credits according to the priority and demand comprises, for at least one flow, distributing credits proportional to the priority for the flow and less than the demand for the flow.

6. The method of claim 1, wherein the inheriting and the distributing remaining credits according to priority and demand result in an internal I/O flow corresponding to an external I/O flow of higher priority receiving more credits than an internal I/O flow corresponding to an external I/O flow of lower priority.

7. The method of claim 1, wherein the demands are based on latency of underlying storage in the storage system and wherein distributing the credits based on the minimum I/O operations per unit time value and distributing the remaining credits according to the priority and demand ensure credits given to the external I/O flows are consistent with latency and throughput of the underlying storage.

8. A tangible, non-transitory, computer-readable media having instructions thereupon which, when executed by a processor, cause the processor to perform a method comprising:

tracking, in a storage system, for one or more computing machines or virtual machines implemented with physical computing resources, each of a plurality of external I/O (input/output) flows, having I/O requests for the storage system, and corresponding internal I/O flows;

inheriting service-level agreement (SLA) values including priorities and minimum I/O operations per unit time from the external I/O flows to the internal I/O flows;

calculating demands for each of the external I/O flows and each of the internal I/O flows;

assigning credits for each of the external I/O flows and each of the internal I/O flows, based on the minimum I/O operations per unit time in accordance with the service-level agreement values; and assigning further credits for each of the external I/O flows and each of the internal I/O flows, based on the priorities and calculated demands.

9. The computer-readable media of claim 8, wherein the method further comprises:

managing the internal I/O flows through at least one storage stack or storage queue in the storage system, on paths to underlying storage devices or storage tiers, consistent with the credits of the internal I/O flows.

10. The computer-readable media of claim 8, wherein calculating the demands for each of the external I/O flows and each of the internal I/O flows comprises:

calculating a demand based on arrival I/O operations per unit time and total latency for serving and queuing, for each of the external I/O flows and each of the internal I/O flows.

11. The computer-readable media of claim 8, wherein the assigning further credits for each of the external I/O flows and each of the internal I/O flows, based on the priorities and calculated demands comprises:

determining credits proportional to priority, for each of the external I/O flows and each of the internal I/O flows, based on the priorities from the service level agreements.

12. The computer-readable media of claim 8, wherein the assigning further credits for each of the external I/O flows and each of the internal I/O flows, based on the priorities and calculated demands comprises:

determining credits proportional to priority and less than calculated demand, for each of the external I/O flows and each of the internal I/O flows.

13. The computer-readable media of claim 8, wherein calculating the demands comprises:

setting a demand of a flow proportional to an arrival I/O operations per unit time of the flow if a total latency for serving and queuing the flow is less than or equal to a deadline for the flow based on the service-level agreement values and otherwise setting the demand of the flow proportional to a sum of the arrival I/O operations per unit time of the flow plus the total latency for serving and queuing the flow, divided by the deadline for the flow, for each of the external I/O flows and each of the internal I/O flows.

14. A storage system with an internal flow mechanism for Quality of Service, comprising:

at least one processor;

a first port configured to couple to one or more computing machines or virtual machines;

a second port configured to couple to a storage memory;

a flow tracker, configured to track external I/O (input/output) flows having I/O requests from the one or more computing machines or virtual machines and configured to track internal I/O flows corresponding to the external I/O flows;

the flow tracker configured to inherit, from the external I/O flows to the internal I/O flows, service-level agreement (SLA) values including priorities and minimum I/O operations per unit time;

a demand calculator configured to calculate demands for each of the external I/O flows and each of the internal I/O flows, each demand as an estimate of I/O operations per unit time demanded by a workload; and a credit assignor configured to:

distribute credits to the internal I/O flows and the external I/O flows according to minimum I/O operations per unit time values, based on the service-level agreement values; and distribute remaining credits to the external I/O flows and the internal I/O flows according to priority and demand of each of the external I/O flows and the internal I/O flows.

15. The storage system of claim 14, further comprising:
one or more storage stacks or storage queues; and
the flow tracker configured to manage the internal I/O flows through the one or more storage stacks or storage queues on paths to the storage memory, based on the credits assigned to each of the internal I/O flows.

16. The storage system of claim 14, wherein each demand is based on arrival I/O operations per unit time and total latency for serving and queuing, for each of the external I/O flows and each of the internal I/O flows.

17. The storage system of claim 14, further comprising:
the credit assignor configured to determine credits proportional to priority, for each of the external I/O flows and each of the internal I/O flows, based on the service-level agreement values.

18. The storage system of claim 14, further comprising:
the credit assignor configured to determine credits proportional to priority and less than calculated demand, for each of the external I/O flows and each of the internal I/O flows, wherein the priority is based on the service-level agreement values.

19. The storage system of claim 14, further comprising:
the credit assignor configured to assign a greater number of credits to an internal I/O flow corresponding to an external I/O flow of higher priority than to an internal I/O flow corresponding to an external I/O flow of lower priority, as a result of the service-level agreement values being inherited from the external I/O flows to the internal I/O flows.

20. The storage system of claim 14, further comprising:
the demand calculator configured to set a demand of a flow proportional to an arrival I/O operations per unit time of the flow when a total latency for serving and queuing the flow is less than or equal to a deadline for the flow based on the service-level agreement values, for each of the external I/O flows and each of the internal I/O flows; and the demand calculator configured to set the demand of the flow proportional to a sum of the arrival I/O operations per unit time of the flow plus the total latency for serving and queuing the flow, divided by the deadline for the flow, when the total latency for serving and queuing the flow is greater than the deadline for the flow based on the service-level agreement values, for each of the external I/O flows and each of the internal I/O flows.

* * * * *